May 15, 1962 D. R. SKOYLES 3,035,198
DEFLECTION AND FOCUSING APPARATUS FOR CATHODE RAY TUBES
Filed March 7, 1958 13 Sheets-Sheet 1

INVENTOR
*DEREK ROBERT SKOYLES*
BY
AGENT

May 15, 1962 — D. R. SKOYLES — 3,035,198
DEFLECTION AND FOCUSING APPARATUS FOR CATHODE RAY TUBES
Filed March 7, 1958 — 13 Sheets-Sheet 2

INVENTOR
*DEREK ROBERT SKOYLES*

BY
AGENT

INVENTOR
DEREK ROBERT SKOYLES

May 15, 1962    D. R. SKOYLES    3,035,198
DEFLECTION AND FOCUSING APPARATUS FOR CATHODE RAY TUBES
Filed March 7, 1958    13 Sheets-Sheet 5

INVENTOR
DEREK ROBERT SKOYLES
BY
AGENT

May 15, 1962  D. R. SKOYLES  3,035,198
DEFLECTION AND FOCUSING APPARATUS FOR CATHODE RAY TUBES
Filed March 7, 1958  13 Sheets-Sheet 6
FIG.14a
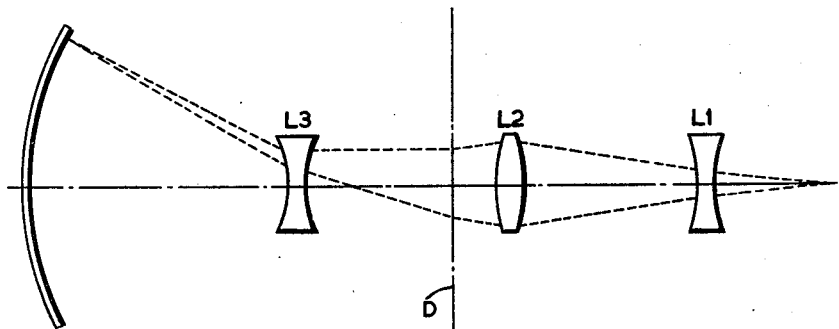
FIG.14b
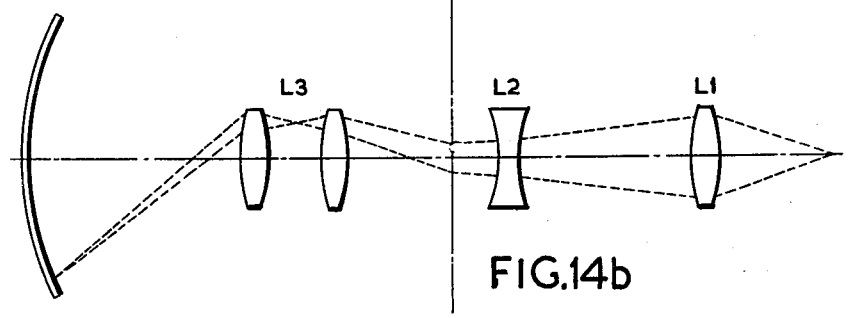
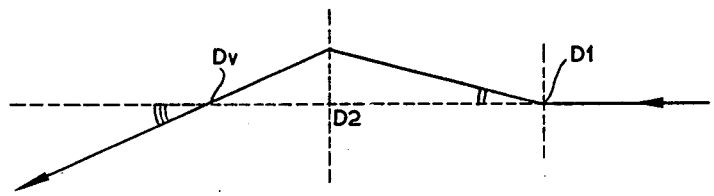
FIG.15
INVENTOR
DEREK ROBERT SKOYLES
BY
AGENT May 15, 1962    D. R. SKOYLES    3,035,198
DEFLECTION AND FOCUSING APPARATUS FOR CATHODE RAY TUBES
Filed March 7, 1958    13 Sheets-Sheet 8

DEFLECTION AXIS

INVENTOR
DEREK ROBERT SKOYLES

BY

AGENT

May 15, 1962 D. R. SKOYLES 3,035,198
DEFLECTION AND FOCUSING APPARATUS FOR CATHODE RAY TUBES
Filed March 7, 1958 13 Sheets-Sheet 9
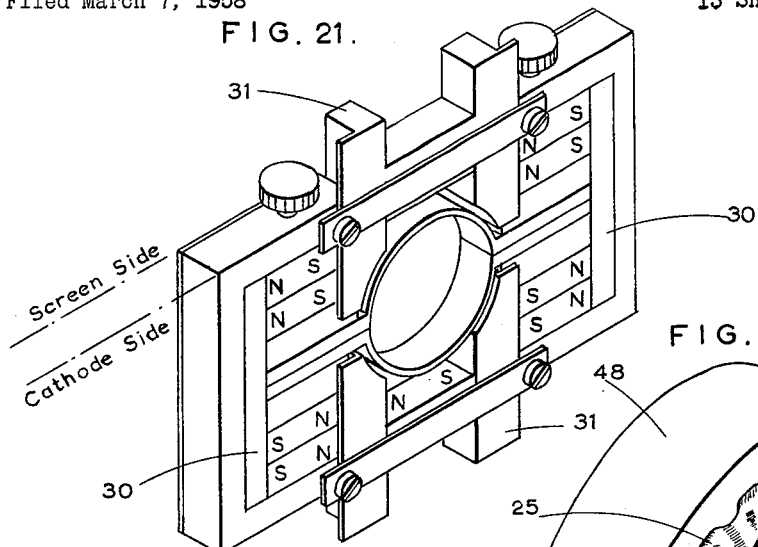
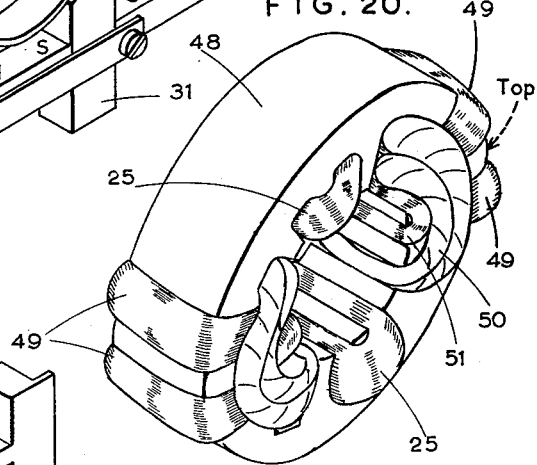
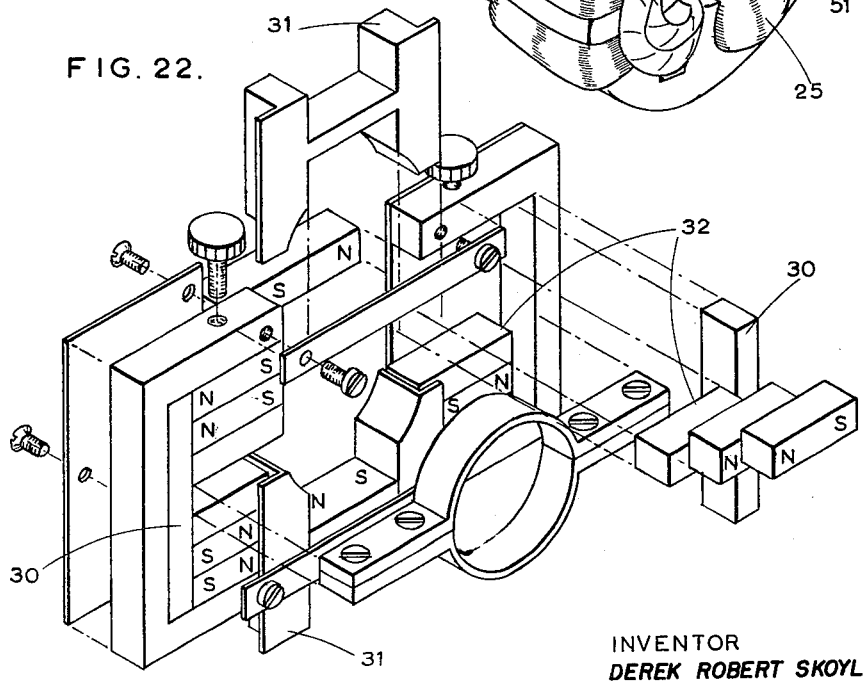
INVENTOR
*DEREK ROBERT SKOYLES*
BY
*AGENT*

May 15, 1962 D. R. SKOYLES 3,035,198
DEFLECTION AND FOCUSING APPARATUS FOR CATHODE RAY TUBES
Filed March 7, 1958 13 Sheets-Sheet 10

INVENTOR
*DEREK ROBERT SKOYLES*
BY
*Frank R. Trifari*
AGENT

May 15, 1962 D. R. SKOYLES 3,035,198
DEFLECTION AND FOCUSING APPARATUS FOR CATHODE RAY TUBES
Filed March 7, 1958 13 Sheets-Sheet 11
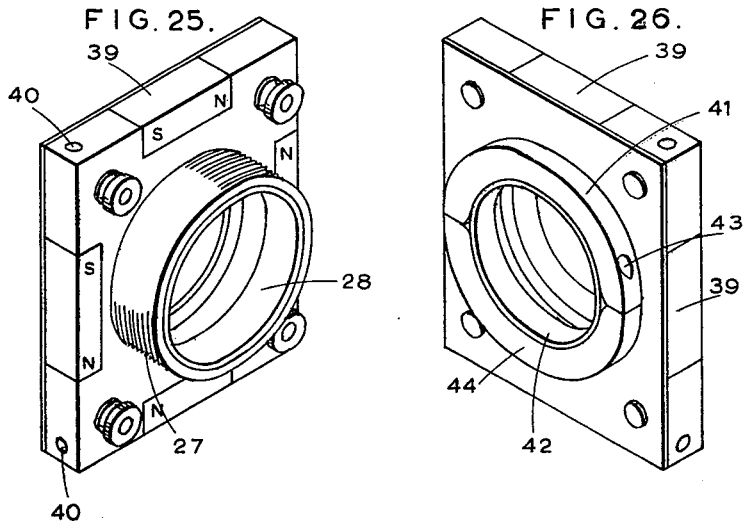
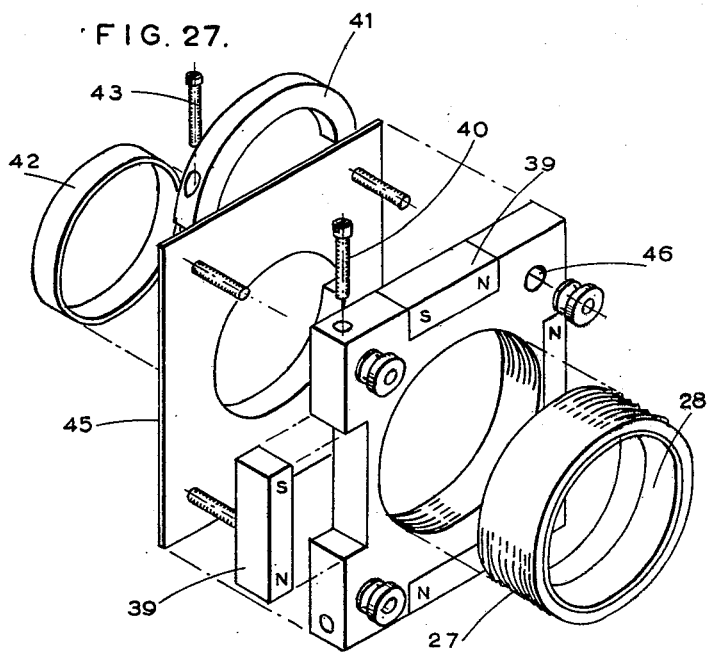
INVENTOR
*DEREK ROBERT SKOYLES*
BY
*AGENT*

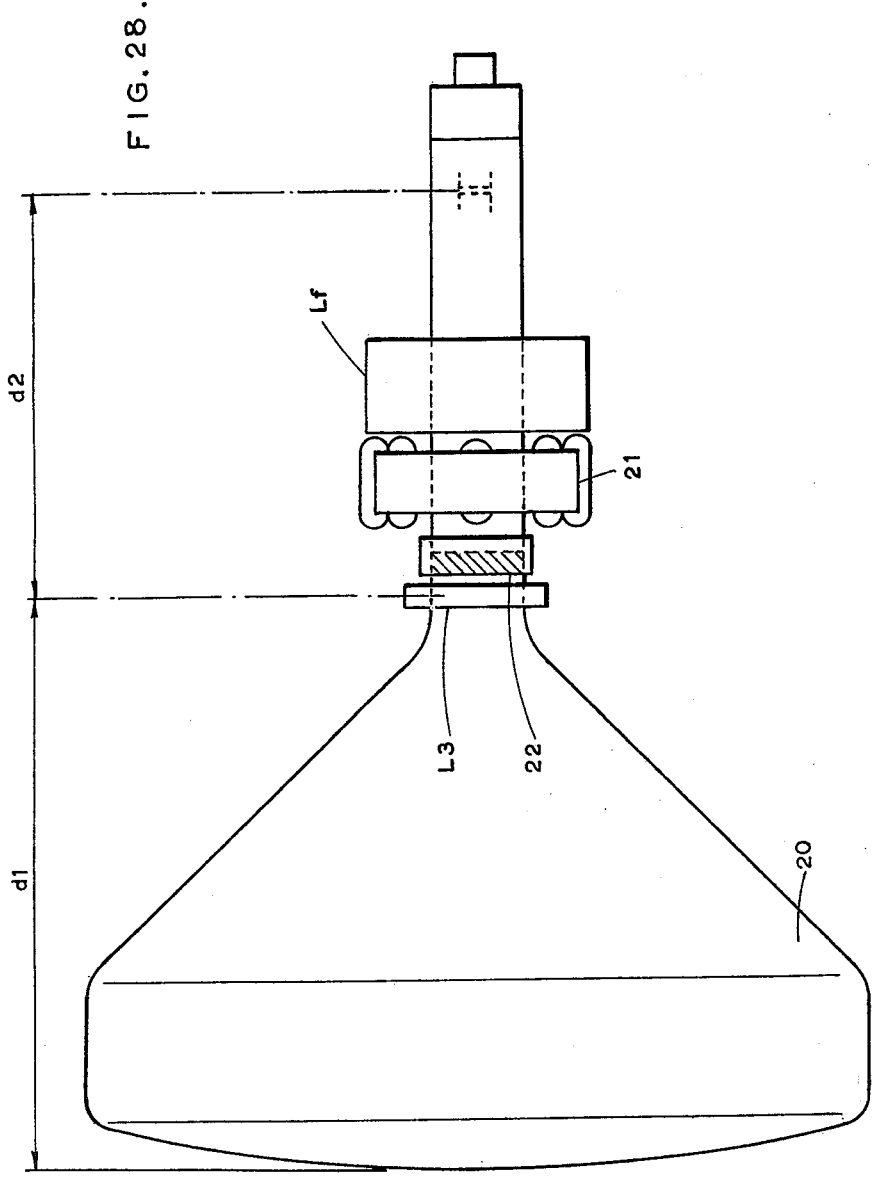

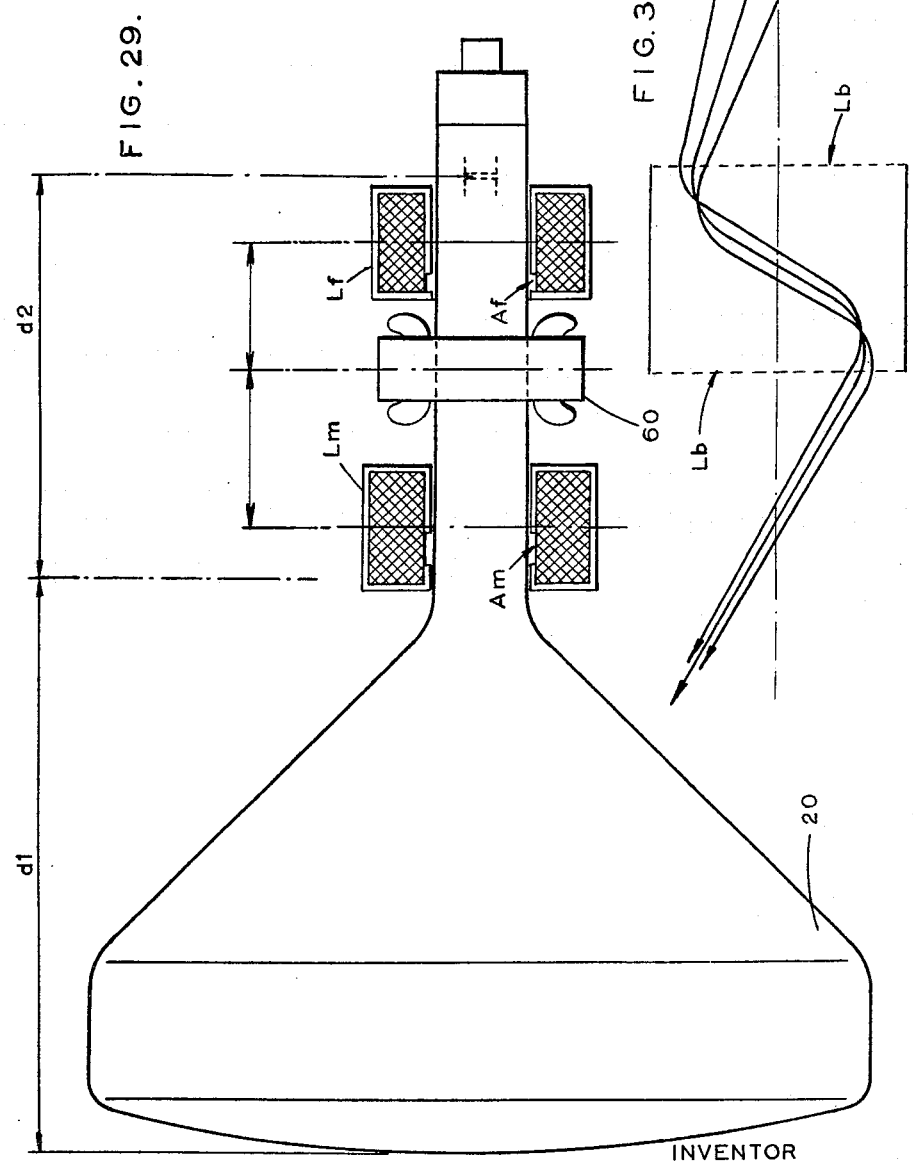

3,035,198
DEFLECTION AND FOCUSING APPARATUS FOR CATHODE RAY TUBES
Derek Robert Skoyles, Clapham Common, London, England, assignor to North American Philips Company, Inc., New York, N.Y.
Filed Mar. 7, 1958, Ser. No. 719,772
Claims priority, application Great Britain Mar. 13, 1957
3 Claims. (Cl. 313—76)

This invention relates to electron beam deflection and focusing apparatus for cathode ray tubes. The invention is of interest in relation to deflection and focusing apparatus suitable for cathode ray tube scanning devices as used for television scanning or display, but the invention is applicable also to cathode ray devices for other purposes, for example information storage and oscilloscope display.

It is an object of the invention to provide improved electron beam deflection and focusing apparatus capable of providing larger deflection angles for a given deflection power or capable of providing a given deflection angle with less deflection power than with conventional systems.

It has been proposed to increase the deflection sensitivity of a cathode ray tube in a selected plane by providing between the respective deflecting means and the screen or target an electron lens having diverging characteristics in said plane.

In one such proposal it is recognized that practical diverging lenses of known construction such as quadripole lenses, whether magnetic or electrostatic, have (as explained later) converging characteristics in the plane normal to the selected plane. Consequently, the proposal suggests accepting reduced sensitivity and increased energy requirements for deflection in the plane normal to the selected plane. However, the proposed arrangement cannot take advantage of the maximum sensitivity that could be provided by a diverging lens in the selected plane because this would cause an excessive increase in the deflection energy required in the orthogonal plane; the reason for this is that any increase in the diverging power of a quadripole lens in one plane causes an increase in its converging power in the other plane.

In a further prior proposal the said loss of deflection sensitivity in the orthogonal plane is avoided by effecting the deflections normal to the selected plane in a region between the screen or target and the lens. However, this solution necessitates in practice the production of a fairly homogeneous deflecting field over a cross-sectional area which is much larger than that of the conventional tube neck, and this is difficult and expensive to achieve, particularly if it is desired to avoid any increase in deflection power as compared with conventional methods.

It is a further object of the invention to increase the deflection sensitivity of a cathode ray tube simultaneously in each of two orthogonal deflection planes.

According to one aspect of the invention, electron beam focusing apparatus comprises in combination an astigmatic electron lens having beam diverging characteristics in a selected deflection plane and having beam converging characteristics in the plane orthogonal to said selected plane, and beam focusing means coaxial with said lens and spaced therefrom along the common optical axis, said lens and focusing means having such powers as to create an external focus in said selected plane while creating in said orthogonal plane a focus within the lens field and a separate focus external to the combination. (The term "lens" should be regarded herein as including a composite lens).

With such an arrangement the external focus in the selected plane can be made to coincide or substantially coincide with the external focus in the orthogonal plane, and the arrangement may be used in combination with means for deflecting an electron beam in each of said planes which means are located on the same side of the centre or centre region of the lens as said focusing means. Thus greater deflection sensitivities can be obtained in the selected plane (which may be referred to for convenience as the X plane) than is achieved in the aforesaid prior proposals because the power of the lens in the diverging direction can readily be increased by increasing its power freely in the converging direction.

As regards the plane orthogonal to the X or selected plane (which may be referred to as the Y plane), the mode of operation depends on the particular application. In one of the possible modes the convergence of the lens is adjusted so that it focuses the beam on or near the screen or target as will be explained with reference to FIGURE 8 of the drawings. In these circumstances deflection sensitivity is zero and it is not possible to effect any deflection in the Y plane, but magnification in the X plane is greater than in the said prior proposals and the arrangement can be used e.g. in uni-dimensional line scanning applications such as flying-spot scanners for films or television display devices employing mechanical means to provide a frame scan as described in copending patent applications, Serial Nos. 616,981, now Patent No. 2,957,044, and 625,020, now abandoned, filed, respectively, on October 19, 1956 and November 29, 1956.

As an alternative to the above mode of operation, it is possible to obtain a degree of negative sensitivity in the Y plane with consequent further magnification in the X plane, and this may be done to such an extent as to provide magnifications greater than unity for deflections applied in the Y direction in the region of the lens or on the gun side thereof. Thus, according to a further aspect of the invention, cathode ray apparatus comprises in combination an astigmatic electron lens having beam diverging characteristics in a selected deflection plane and having beam converging characteristics in the plane orthogonal to said selected plane, beam focusing means coaxial with said lens and spaced therefrom along the common optical axis, a cathode ray tube having an electron gun at or near said axis on the side of the focusing means remote from said lens and a screen or target intersecting said axis at a point on the side of said lens remote from the focusing means, and means for deflecting an electron beam in at least one of said planes which means are located on the same side of the centre or centre region of the lens as said focusing means, said lens and focusing means having such powers as to create a focus in said selected plane at or near said screen or target while creating in said orthogonal plane a focus within the lens field and a separate focus at or near said screen or target.

With such an arrangement the converging power of the lens in the Y plane is so great that the beam paths are caused to invert their direction so that, for example, a beam entering the lens with an upward inclination will emerge along a downwardly inclined path and vice versa. Although the focusing problem has not been referred to in detail hitherto, a passing reference thereto will be made at this point to assist in applying a suitable designation to this over-convergent cross-over type of lens. The individual electron paths cross over at a focus inside the lens and are reconverged before emerging therefrom towards an external focus; since an image of the cathode (or of the first cross-over normally formed near the cathode) is thus formed inside the lens where it is immersed in the field thereof, such a cross-over lens characteristic will be referred to as an "image-immersion" characteristic.

Apparatus according to the above further aspect of the invention is very suitable for raster scanning applications, for example television display. In fact, the reduction in scanning energy requirements can be used to facilitate so-called wide-angle scanning (e.g. with angles of about 110°) and can also be used to facilitate the use of transistors in the scanning circuits. By contrast with the aforesaid prior proposals, a degree of negative magnification greater than unity can be provided in the Y direction (which may be used for the frame scan) while much greater magnification is obtained in the X direction (the use of negative magnification implies that the direction of the Y scan is reversed to allow for the cross-over of the beam).

In reviewing the foregoing, it may be convenient to adopt the following terminology in relation to deflections applied in the region of the lens or in the region between the gun and the lens:

(a) Zero magnification occurs when the position of the deflecting field and the strength and characteristics of the lens and focusing means are such that the beam will not respond to the deflecting field in such manner as to move its point of impact on the screen or target;

(b) Positive magnification occurs, as normally, when the beam finally emerges in the same sense as the force applied by the deflecting field; in this case angular magnification equals unity when the beam angle relative to the optical axis remains unchanged after leaving the deflection field;

(c) Negative magnification occurs, as mentioned above, when there is cross-over of the beam; in this case angular magnification is unity when the beam is acted on by the lens in such a manner that the beam emerges from the lens at an angle to the optical axis equal and opposite to its angle of entry into the lens.

Hereinafter the references to magnification will relate to angular magnification in some cases while in others magnification will be expressed as power magnification (reduction of deflection power required for a given deflection angle): as will be appreciated, power magnification is the square or approximately the square of angular magnification, and the former is the more significant for the purpose of performance comparisons with conventional arrangements. In some instances gain will be expressed in a third manner as spot-displacement gain (this is convenient in cases in which the deflection centre differs in the two arrangements compared).

The above-mentioned aspects of the invention permit deflection with positive magnifications many times greater than unity in the X plane and negative-magnification in the Y plane; if magnification is increased in the X plane, negative magnification in the Y plane is also increased. If the latter increase is taken beyond the point where the negative magnification is unity, a limited further deflection gain becomes available in the Y plane in addition to the increased magnification present in the X plane.

As will have been appreciated, the aspects of the invention hitherto described involve special focusing problems. Such problems, and solutions thereto, will be described with reference to the drawings. Meanwhile, however, a general point will be made: since the lens used is astigmatic, it follows that the focusing means will, in general, have astigmatic characteristics such as to compensate for the astigmatism introduced by the lens (in particular, the focusing means should provide additional pre-focusing in the X plane so as to correct for the de-focusing inherent in the magnifying action applied in that plane). However, there is a notable exception in which the over-convergence of the lens in the Y plane is adjusted to such a value that its external focus coincides with the X plane focus of the lens: this case is advantageous in that it permits the focusing means to have the same characteristics in both planes so that such means may have spherical characteristics.

Hitherto, magnification by the cross-over method has been applied only in one plane (the Y plane). However there is a modification of the invention which is based on the fact that, whereas in practice it is difficult for electrostatic electron lenses and impossible for magnetic lenses to have diverging characteristics in both the X and Y planes, it is possible for a lens to have image-immersion characteristics in both these planes. Thus, according to the modification of the invention, electron beam focusing apparatus comprises in combination an electron lens having converging characteristics in a selected deflection plane and in the plane orthogonal to said selected plane, and beam focusing coaxial with said lens and spaced therefrom along the common optical axis, said lens and focusing means having such powers as to create in each of said planes a focus within the lens field and a separate focus external to the combination.

Such a lens may be made spherical so as to give the same deflection magnification in both the X and the Y planes, in which case spherical focusing means may be used.

The principles and applications discussed above will now be described in greater detail, together with specific examples, with the aid of the drawings in which the same references are used for the same or corresponding elements (the X and Y notation will be retained for the deflection planes and the intersection of said planes will be taken as the optical axis). The principles, as well as the method by which the invention is to be performed, will be explained mainly in relation to magnetic magnifying lenses.

The drawings are diagrammatic except for FIGURES 11A–11B, 16 and 20 to 29. In the drawings:

FIGURE 11 is a lens and circuit diagram suitable for use in the system of FIGURES 10A–10B while

FIGURES 14A and 14B illustrate the deflection-magnifying action of the system of FIGURES 10A–10B in the X and Y planes respectively;

FIGURE 15 illustrates deflection by a two-stage method.

FIGURE 16 is a general side elevation, substantially to scale, of an arrangement referred to as Example II, while FIGURES 17 to 19 are explanatory diagrams and FIGURES 20 to 27 are detail views of components drawn substantially to a common (larger) scale;

FIGURES 28 and 29 are side elevations, substantially to scale, of arrangements referred to respectively as Examples III and IV;

FIGURE 30 illustrates schematically multiple cross-over action in a lens.

Figure 1:
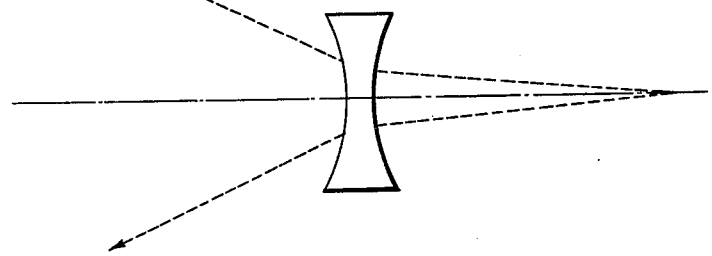
FIGURES 1 and 2 illustrate the deflection-magnifying action in the X plane.
Figure 2:
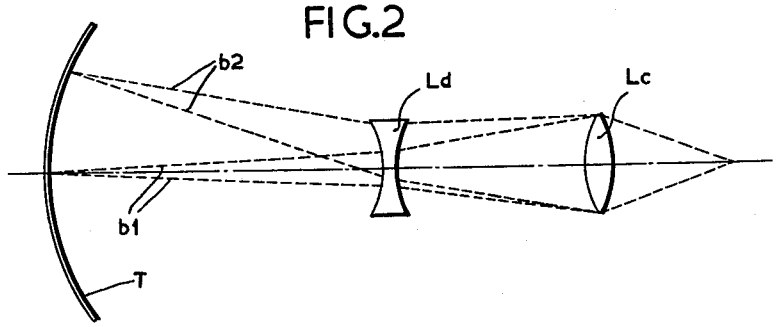

(I) The operation of a system is considered in the selected or X deflection plane, it will be understood from FIGURE 1 (showing individual rays in an optical equivalent of an electron-optical arrangement) that the diverging lens will amplify any angular deflection of the beam. However, said lens will also have a defocusing effect on the electron beam in the selected plane, i.e. in the plane of the drawing. This is due to the fact that if the electrons of the beam travel in spaced paths they effectively pass through the diverging lens at different points and consequently have their paths bent to differing extents. This difficulty can be overcome by the provision, as aforesaid, of focusing means having converging characteristics in the selected plane, the value thereof being arranged to be such that the system as a whole still provides a convergent beam having a focus at or near a predetermined distance corresponding to the target or screen of the cathode ray tube. This effect will be understood more clearly by reference to FIGURE 2 of the drawings which shows, in optical equivalents, a converging focusing lens Lc, preceding the diverging magnifying lens Ld. The preliminary excessive convergence applied by the lens Lc in the selected or X deflection plane is reduced by the diverging lens Ld but is not entirely compensated. Thus a smaller degree of convergence remains after the beam has traversed the system and the residual convergence can be arranged to be such as to provide focusing on the screen or target T. This fact still holds good when deflection is applied to the beam at the lens Lc so that the beam is deflected from a position $b1$ on the optical axis to a position such as $b2$.

Figure 3:
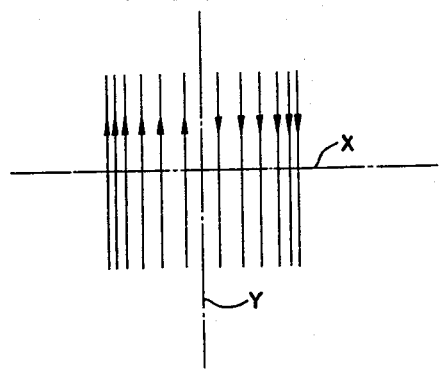
FIGURES 3 to 5 illustrate the use of a magnetic lens for effecting such magnifying action in the X plane.
Figure 4:
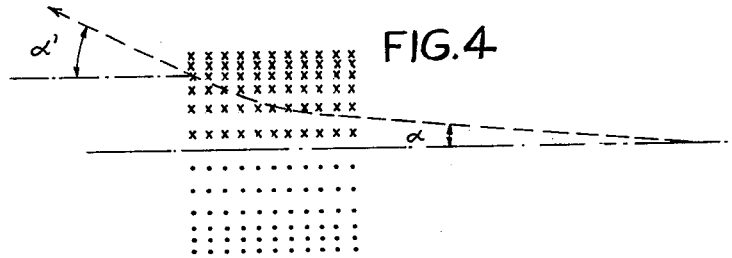

The effect described with reference to FIGURE 1 will now be described in relation to a magnetic lens system with reference to FIGURES 3 and 4. In these figures only action in the selected deflection plane X (FIGURE 3) will be considered (FIGURE 4 is a section taken on said plane X); in other words, it will be assumed at this stage, for the sake of simplicity, that the lenses involved are of a plain "cylindrical" nature in spite of the fact that in practice magnetic lenses of this character cannot be obtained while electrostatic cylindrical divergent lenses are very difficult to obtain. FIGURE 3 shows the desired magnetic field configuration of the diverging lens Ld as viewed from the electron gun. The direction of magnetisation is different on the two sides of a median plane Y in which plane the field strength is zero, the plane Y intersecting the selected plane X along the optical axis. If the beam is deflected into the left-hand of the field it will be bent thereby still further to the left, and conversely, if the beam is deflected into right-hand half of the field it will be bent still further to the right thereby providing a degree of magnification greater than unity for the deflection motion. This magnification is known per se as aforesaid and the further steps described are concerned chiefly in overcoming or utilising the quadrature field effects of such systems. The magnification of the deflection motion in the plane X is shown more clearly in FIGURE 4 in which the lines of force of the diverging lens are normal to the plane of the drawing (which is the plane X) and are indicated by dots or crosses depending on the direction of magnetisation. If the deflection means (not shown) applies to an electron path an angular displacement $\alpha$, it can be seen that an angular magnification of $\alpha'/\alpha$ is obtained.

The quantitive nature of the field configuration of the lens of FIGURES 3 and 4 should preferably be such as to provide a constant or approximately constant degree of magnification and de-focusing throughout the full range of deflection angles in the plane X. In other words, since the flux density gradient or field strength across the beam determines the extent of divergence, it is important that a substantially constant flux density gradient be formed across the tube neck in the centre region. If this linear gradient extends to the outer regions of the lens as in known quadripole lenses having equilateral rectangular hyperbolic pole-faces, and if the effective axial length of the lens is substantially constant throughout its working aperture, then the deflection angle must still be limited to the centre region unless the application is one in which material variations in deflection sensitivity and focus can be tolerated. For applications in which such variations cannot be tolerated and in which regions other than the centre region are required for use, e.g. television display applications, means for modifying this lens field configuration will be described, which means compensate for changes in beam path length within the lens and other effects due to the wider scanning angles.

Figure 5:
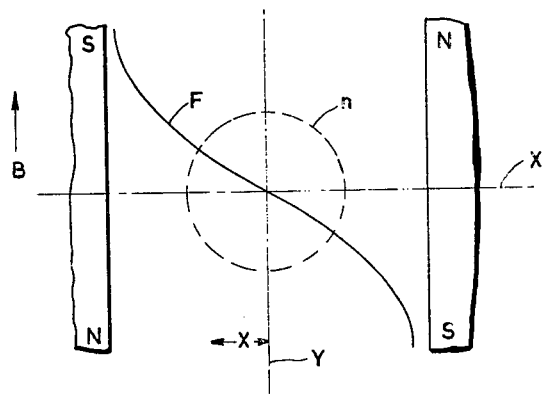
Figure 6:
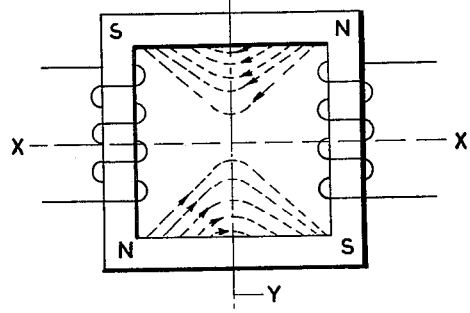
FIGURE 6 illustrates the properties of a quadruple lens in the Y plane.

As will be seen from the flux density curve F of FIGURE 5, a constant gradient can be readily approximated by placing two elongated bar-magnet field sources N—S in proximity to the tube neck $n$ but so spaced therefrom that the non-linear fringe flux near each source is not used (such a distribution of North (N) and South (S) poles is known as a "quadripole"). This will be adopted, together with the assumption of relatively small scanning angles, for the sake of simplicity, in the part of the following description relating to FIGURES 6 to 12.

Hitherto an ideal "cylindrical" divergent magnifying lens has been postulated, such lens employing an ideal field e.g. as shown in FIGURES 3 and 4. However, as has been stated, it is not possible in practice to produce a purely cylindrical magnetic lens. In particular, it is not possible to obtain the previously described opposite adjacent field regions having magnetic lines of force parallel to each other. Even if very long permanent magnets or electro-magnets are used to produce the two halves of the field, stray flux lines develop across the gap between the two magnets and distort the ideal field configuration. In fact the quadripole disposition of the magnetic poles causes quadrature lines of force to be formed as shown in dotted lines in FIGURES 6 in a more orthodox example of a quadripole. These fluxes compress the spot in the Y direction and any angular deviation from the axis in the Y direction is de-magnified by said fluxes.

It is the latter effects which have limited the scope of the prior proposals in the manner previously explained and have led to the acceptance of smaller gains in the X plane or the adoption of Y deflecting means located between the lens and the screen. Incidentally, the latter arrangement provides only a partial solution not only for the reasons previously stated, but also because the focusing action of the magnifying lens in the Y plane requires astigmatic focusing means and the astigmatism thereof must increase with every increase in magnification in the X plane.

Figure 8:
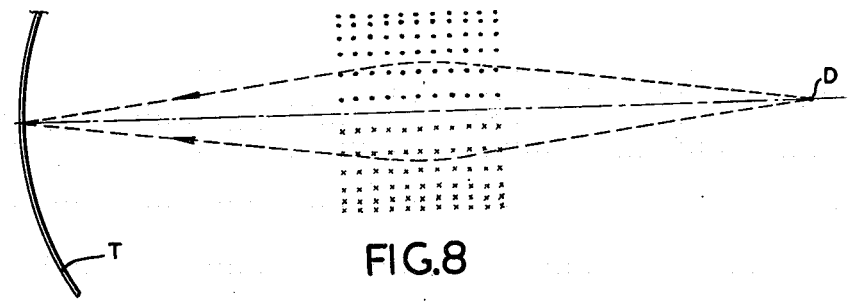

However, as has been stated earlier, the inevitable converging action of the magnetic magnifying lens in the Y direction can be increased until a point is reached where no deflection of the beam is possible at the tube face as the screen centre becomes the image point for an object situated at the deflection centre (this is illustrated in FIGURE 8 if point D represents the centre of deflection). This arrangement suffers from the focusing disadvantages of the said prior proposals. However, if the increased astigmatic focusing requirements can be met, then a system according to FIGURE 8 can be used to provide, as aforementioned, increased sensitivity in the X plane e.g. for applications which do not require deflection or scanning in the Y plane where deflection sensitivity has been reduced to zero. As regards focusing in the Y plane, the beam is made to diverge initially in the Y direction so as to enable the magnifying lens to form a focal point on the screen or target T as illustrated in FIGURE 8. This implies considerable initial astigmatism in the beam since the latter must still converge in the X direction as explained with reference to FIGURE 2.

Figure 7:
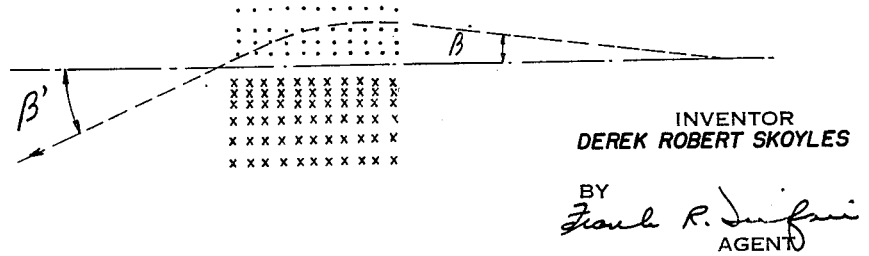
FIGURES 7 to 9 illustrate the use of the convergent characteristics of a quadripole magnifying lens in the Y plane.

If, in accordance with a principal aspect of the invention, this condition is passed by increasing still further the converging power of the magnifying lens in the Y plane, negative deflection angles are obtained with a cross-over or image-immersion action in the Y direction and even a negative magnification greater than unity is possible. This is illustrated in FIGURE 7 which is a longitudinal section of a field configuration such as that shown in FIGURE 6 taken on the plane Y. Such a solution implies, of course, an inversion of the Y deflection field.

The negative deflection magnification $\beta'/\beta$ thus obtainable in the Y direction carries with it an inherent de-focusing action analogous to the de-focusing action present in the X direction as explained with reference to the positive $\alpha'/\alpha$ magnification illustrated in FIGURE 4.

Figure 9:
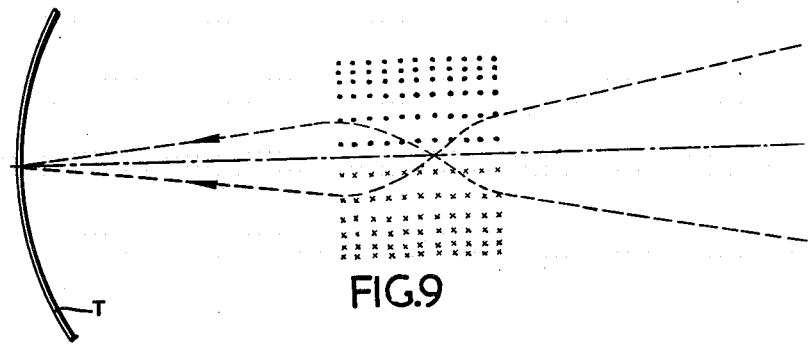

This de-focusing action in the Y direction may be compensated in the same way as the de-focusing action present in FIGURE 1. Thus the beam may be made to converge initially also in the Y direction so that cross-over occurs at a first focus inside the lens and produces a further focus at the screen or target T as shown in FIGURE 9. This arrangement is advantageous inasmuch as the beam can be initially convergent in both the X and the Y directions. Moreover, the power of the magnifying lens may be increased simultaneously in both planes to the point where the negative magnification in the Y plane exceeds unity as represented by the gain $\beta'/\beta$ of FIGURE 7 (magnification in the X plane is increased simultaneously and becomes very large).

This process may be pursued until a special condition is reached in which the focusing means causes the beam to converge initially to a common image plane in the X and Y directions so that astigmatism is no longer necessary in the focusing means. This permits the use of a focusing electron lens equivalent to an optical spherical lens, and an example thereof will be described later. However, this restricts the facility of adjustment of deflection magnification by action on the magnifying lens. Moreover, simple magnetic lenses of this type have a tendency to cause disadvantageous aberrations which are probably due to field interactions.

Both these disadvantages can be obviated by replacing the spherical focusing lens with an orthogonal pair of magnetic quadripole lenses. A specific embodiment employing such focusing means will now be described with reference to FIGURES 10A, 10B, 14A and 14B as applied to a scanning system for producing a raster of lines and frames such as is required for television purposes. For a given tube, this deflection and focusing system will cause, both in the X and the Y directions, greater optical magnification of the electron beam object which is imaged by the spot on the screen than is the case with a conventional focusing system. However, although the resolution is thus reduced, especially in the Y plane, the system is capable of providing satisfactory television pictures when employing e.g. the apparatus described later as Example II.

In a practical example the operation of this arrangement in the said special condition has permitted the following approximate power and angular magnifications to be obtained:

power 100:1 in the X plane; (= angular of about 10)
power 2:1 in the Y plane; (= angular of about 1.4)

These figures are taken as a comparison with a conventional television display arrangement and take into account the fact that in practice more magnification can be obtained than is immediately obvious because, owing to the formation of a virtual centre of deflection, the deflection means can be located further from the screen than with orthodox deflecting and focusing means applied to the same cathode ray tube; as a consequence the deflecting means apply a smaller deflection angle than is necessary in an orthodox arrangement for the same linear displacement of the spot.

Naturally, the scan requiring greater driving power, i.e. the line scan, will be described as being applied in the plane in which magnification is greater, i.e. in the X plane. The optical axis shown is the intersection of the X and Y planes.

Figure 10A:
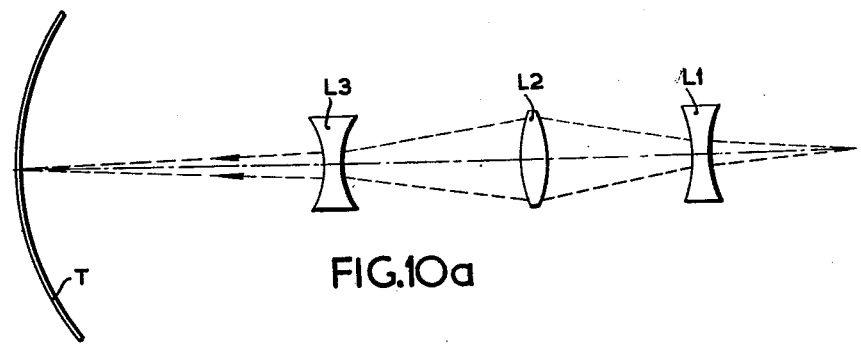
FIGURES 10A and 10B illustrate the action of a preferred system in the X and Y planes respectively.
Figure 10B:
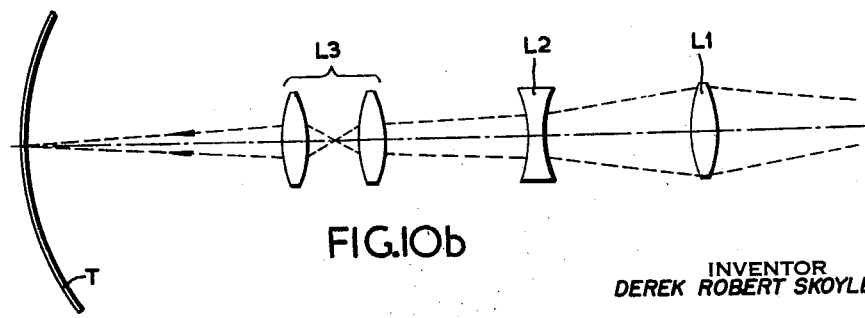

Since each of the quadripole focusing lenses has a converging action in a first plane and a diverging action in a second plane normal to the first plane, the pair can be represented in optical equivalents by lenses L1 and L2 as shown in FIGURES 10A and 10B. FIGURE 10A is a schematic plan view showing the lens action in the line-scan or X plane and FIGURE 10B is a side view of the same arrangement showing the lens action in the frame-scan or Y plane. Magnifying lens L3 applies the divergence in the line direction and has image-immersion properties in the Y plane so as to apply the over-convergence or cross-over in the frame direction. Each of electron lenses L1, L2 can be represented more clearly by an optical lens having the general form shown in perspective in FIGURE 12.

Since FIGURES 10A-10B have been drawn with the beam in the axial direction so as to illustrate principally the focusing action, the deflection-magnifying action described above will be understood more clearly by referring to FIGURES 14A and 14B showing the beam in a deflected position, the letter D showing the plane at which deflection is effected. Incidentally, the action of lens L3 as shown in FIGURE 14B will also assist the understanding of FIGURE 8. In fact, in the case in which the dotted paths of FIGURE 8 are regarded as alternative paths of a narrow beam rather than paths of individual electrons of a common axial beam, the narrow deflected beam will in each position have a cross-over inside the lens L3 as shown in FIGURE 14B.

Figure 13:
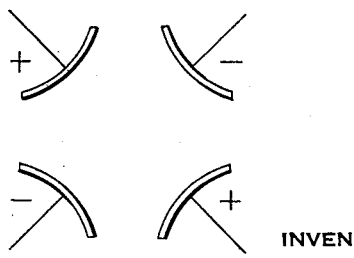
FIGURE 13 represents an electrostatic quadripole.

Although magnetic lenses will be described hereinafter, the arrangement of FIGURES 10A-10B may employ three electrostatic quadripoles as shown in FIGURE 13, the relative orientations and powers being arranged to correspond with the magnetic case. With such an arrangement, separate line and frame scanning means, which may be magnetic or electrostatic, may be located between lenses L2 and L3.

Before specific examples are described, it may be desirable to state more generally certain principles governing the choice of the position of the deflecting means in relation to the positions of the lenses.

In general, if an electron beam is deflected before a diverging lens its deflection angle is increased.

If an electron beam is deflected before a converging lens, its angle of deflection will be decreased if the deflection takes place within a distance 2 F. from the lens (F. being the focal distance).

If the deflection centre is placed beyond 2 F. a reversal of deflection takes place and a negative gain in angle is possible, but since the virtual deflection centre is closer to the screen or target a smaller displacement of the spot may result. Angular gain increases as the distance between the lens and deflection centre increases.

Such a lens is usually too strong for normal focusing in a cathode ray tube when the deflection means occupy a practical position but, if the lens has finite thickness, it is possible to allow it to over-converge the beam so as to perform as an image-immersion lens with an image within its confines as aforementioned. Thus additional focusing prior to the magnifying lens enables the system to:

(a) focus the electron beam on the screen or target;
(b) permit negative angular deflection gain to be obtained from the deflection means.

The deflection centre must be at or near the prior focusing means for maximum gain conditions and this, of course, limits the maximum possible gain.

Thus, in a focus and deflection system using three quadripoles such as the lenses L1–L3 of the arrangement of FIGURES 10A–10B, the following considerations apply for single-stage deflection:

(A) *Considering Deflection in the Y Plane.*—If the centre of deflection is placed at the centre of L3, slight attenuation of deflection angle results. If the deflection centre is moved towards the gun the following occurs. As the deflection centre approaches L2 the gain increases with distance from L3 until said centre coincides with the centre of L2. As the deflection centre moves from L2 and approaches L1, increased gain becomes available, gain now increasing with distance from the centre of L2; as the deflection centre passes the centre of L1, increase of magnification ceases and deflection decreases until the deflection centre coincides with the object cross-over (near the gun) at which point there is zero magnification (these conditions will cause some de-focusing in the Y direction unless the deflection angles are small).

(B) *Considering Deflection in the X Plane.*—When the deflection centre is at the centre of L3, slight magnification is available. As the deflection centre moves towards the gun, greater gain is possible, increasing with the distance from the centre of L3 until the centre of L2 is reached. Beyond this point gain decreases until the deflection centre reaches L1. At and beyond the centre of L1 gain decreases until the deflection centre coincides with the object cross-over.

An arrangement as described with reference to FIGURES 10A–10B tends to provide a spot having a size greater than that obtainable with conventional television display tubes and systems. However, the spot size can be restored to a normal value by increasing the angle of convergence of the beam at the screen or target, which normally implies use of a beam having greater diameter in the focusing region. This may readily be done with a focusing system employing two magnetic quadripole lenses in quadrature since these permit the use of a wider beam and, with a longer tube neck, allow reduced magnification of the object cross-over; alternatively a focusing system employing two magnetic quadripole lenses allows the use of a wider beam obtained by increasing the angle of the beam from the object cross-over. However, there are considerations of simplicity and economy which favour the use of a spherical focusing lens and, if such a lens is to be used, the increase in beam diameter introduces certain problems. As is well known, conventional spherical lenses tend to cause aberrations unless the aperture of the lens is large as compared with the beam diameter. On the other hand, electrostatic spherical lenses of large aperture employing conventional ring electrodes require very high potentials whereas magnetic spherical converging lenses normally tend to produce distinctive aberrations regardless of aperture. Nevertheless, the performance of a conventional magnetic spherical focusing lens may be improved sufficiently by increasing the distance of the gun from the lens and this may readily be effected by lengthening the neck of the tube (an example using such a lens will also be given).

Two examples will now be described of means for carrying out the system of FIGURES 10A–10B in a manner suitable for rectangular raster scanning, the frame scan being applied in the Y plane. Example I employs electro-magnetic lenses while Example II employs permanent magnets for the lenses L1—L2—L3.

*Example I*

Figure 11A:
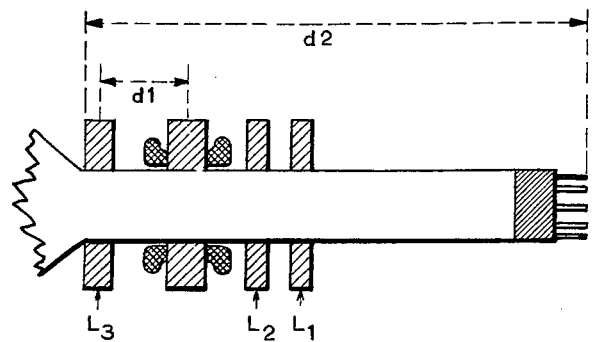
FIGURES 11A–11B are side elevations of two arrangements based on FIGURE 11.
Figure 11B:
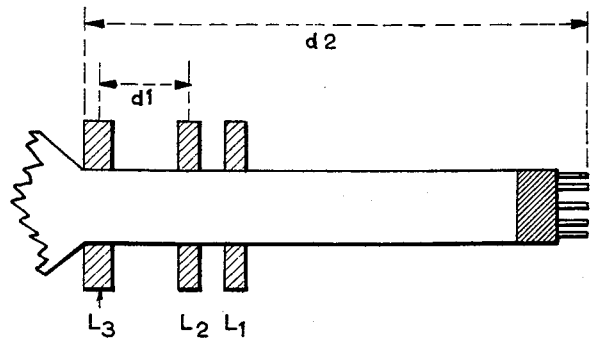
Figure 11:
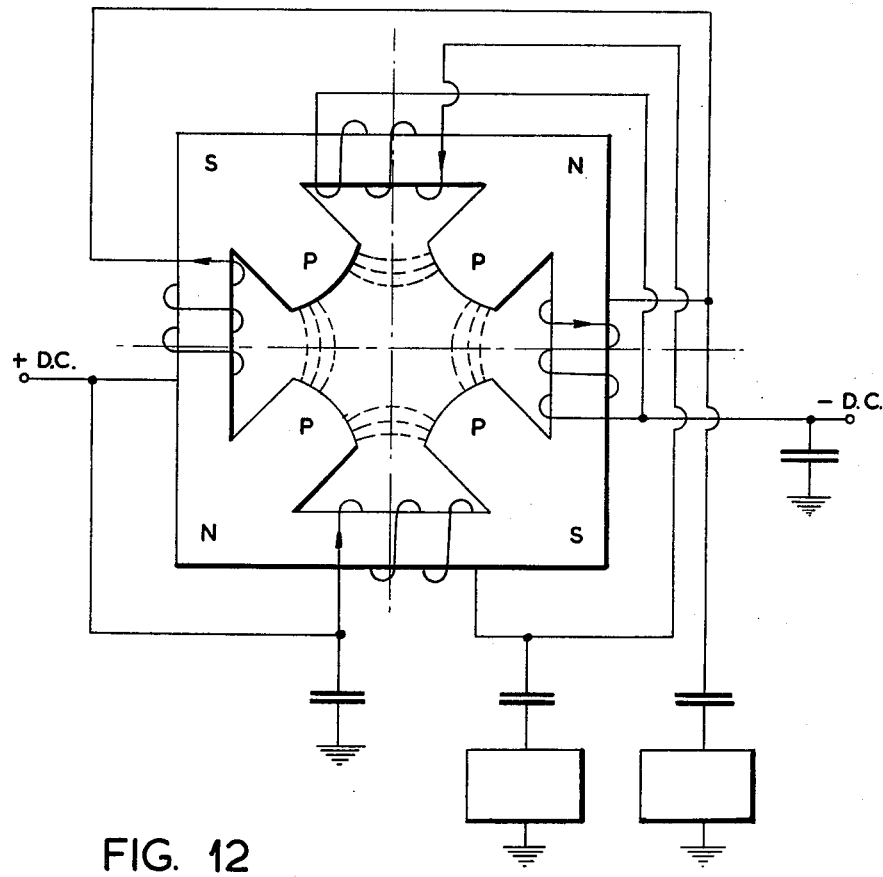
Figure 12:
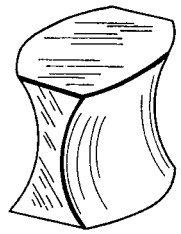
FIGURE 12 is an optical representation in perspective of a lens as used in the system of FIGURES 10A–10B.

Each of lenses L1 to L3 is constructed in known manner as shown in FIGURE 11, with a permeable yoke comprising e.g. four energising windings and pole-pieces or pole formations P having curved pole faces which may have the form of equilateral rectangular hyperbolae. If it is assumed that the latter form is applied accurately to the magnifying lens L3, such lens will have the linear gradient discussed previously, and such gradient will extend substantially throughout the working aperture of the lens. Consequently, the deflection angles will have to be limited if the apparatus is used in a television application in which material variations in deflection sensitivity and focus cannot be tolerated.

If each lens is used solely to provide the D.C. or lens function illustrated in FIGURES 10A–10B, then the circuitry of the four energising windings shown in FIGURE 11 will in all three cases be reduced to the D.C. circuit, the time-bases being connected instead to separate deflection means—such means may effect both scans between lenses L2 and L3, or the line scan between lenses L2—L3 and the frame scan between lenses L1 and L2. In this example the lenses L1 and L2 may be identical except for displacement of the poles by 90°. Lens L3 is a single structure of similar construction and the same orientation as L1, but it has considerably greater power and this is illustrated by the split representation of FIGURE 10B which illustrates one of the effects which occur with increase in converging power.

In an alternative mode of operation, the lens structures L1—L2 described with reference to FIGURES 10A, 10B and 11 form also part of the scanning system. For this purpose the two time-bases can be connected to the existing windings of lens L2 in the manner shown in FIGURE 11 through appropriate D.C. blocking capacitors. The time-bases are not connected to lens L1 which, as before, is similar to L2 but rotated through 90°. Lens L3 can remain unaltered.

This arrangement may be modified by connecting the frame time-base to lens L1 instead of lens L2 while leaving the line scan connections unaltered. In a further modification, separate deflection coils may be wound round both the yokes of lenses L1 and L2, the windings of FIGURE 11 being retained on both lenses for the D.C. lens currents.

It has been mentioned above that approximate deflection gains of 100:1 in the X direction and 2:1 in the Y direction have been obtained with systems based on FIGURES 10A and 10B. In the present example these results were obtained with values as follows:

Flux density gradient measured diametrically between opposite poles of the yoke of the magnifying lens L3 (i.e. at 45° of the X and Y planes) = approximately 190 oersteds/cm.
Diameter of the magnifying lens L3 measured between opposite poles = 40 mms.
Thickness of the yoke of lens L3 = 13 mms.
Tube: Mullard type MF31-55.
Final anode voltage = 16 kv.

This arrangement is shown schematically to scale in FIGURES 11A and 11B, where the distance $d1$ represents 45 mms. while the length $d2$ of the tube neck and base is about 25 cms. (only the yokes of the lenses are shown).

The yokes of the focus lenses L1—L2 are thinner than the yoke of lens L3 but the cross-sections of all three lenses are the same. The lenses L1—L2 are weaker than lens L3 and the spacing between L1 and L2 is the same in both figures.

FIGURE 11A shows a separate conventional scanning yoke with its centre placed at a distance $d1$ behind the centre of L3, such yoke having both line and frame coils. This arrangement is the best of the two as regards deflection de-focusing.

In the arrangement of FIGURE 11B the deflection coils are placed on the yoke of lens L2, so that circuit of L2 can be as shown in FIGURE 11. The centre of lens L2 is about 45 mms. ($d1$) behind the centre of L3. This arrangement is better than that of FIGURE 11A as regards spot size though it is inferior from the point of view of deflection de-focusing.

It has been assumed previously that the quadripole magnifying lens L3 of FIGURE 11 has a flux density gradient which is constant or substantially constant. However, from the point of view of focusing it may be desirable to depart from strict constancy particularly towards the edges of the deflection range. Moreover, there are other reasons for departing from strict constancy and in practice this may be desirable in order to permit the linearity of the scan, the raster shape and/or the focus to be adjusted at the outer regions of the deflection range.

The disadvantages of truly constant gradient, particularly for wide deflection angles, will be explained more fully with reference to a system such as that of FIGURE 11B employing a common magnetic yoke for line and frame deflector coils having a common deflection centre located between the centres of lenses L2 and L3 (the distortion effects in question become progressively worse as the common deflection centre is moved towards the magnifying lens L3).

The first effect is a de-focusing effect which increases progressively towards the edges of the raster and is due to two causes: (*a*) changes in path length of the beam through the magnifying lens L3 and also overall changes in path length; (*b*) curvature of the locus of the image positions of the combination of focusing lenses and deflector coils. Although the effects of these causes (a) and (b) partially cancel out, there is a residue to be corrected.

The second effect is a distortion of the raster due to changes in path length of the beam, and more especially to those changes of path length which take place in the field of lens L3.

A second example based on FIGURES 10A–10B will now be described, said example employing permanent magnet lenses with a magnifying lens having non-linear flux-density gradients.

*Example II*

(*1*) *Introduction.*—This example will be described with reference to FIGURES 16 to 27. The general layout is shown substantially to scale in the side elevation of FIGURE 16. The tube 20 shown has an approximate length $d1+d2$ from screen to grid plane of $16\frac{1}{8}$ inches and has a high-quality triode gun. The three lenses L1, L2, L3 are shown with their yokes in their appropriate positions. A scanning yoke 21 comprising line and frame scanning coils is located between lenses L2 and L3. A shunt 22, the purpose of which will be described later, is located between said yoke 21 and the lens L3. The centre of the magnifying lens L3 is located about $9\frac{1}{4}$ inches ($d1$) from the centre of the tube face. The centres of the other elements are located behind the centre of L3 at these approximate distances:

Shunt 22 at $\frac{5}{8}$ inch from the centre of L3
Scanning yoke 21 at $1\frac{13}{16}$ inches from the centre of L3
Yoke of L2 at $3\frac{1}{4}$ inches from the centre of L3
Yoke of L1 at $4\frac{5}{8}$ inches from the centre of L3

The thicknesses of the yoke of these elements are as follows:

| | Inches |
|---|---|
| Lens L3 | $\frac{3}{8}$ |
| Shunt 22 | $\frac{5}{8}$ |
| Scanning yoke 21 | 1 |
| Lenses L1 and L2 | $\frac{3}{8}$ |

Figure 16:
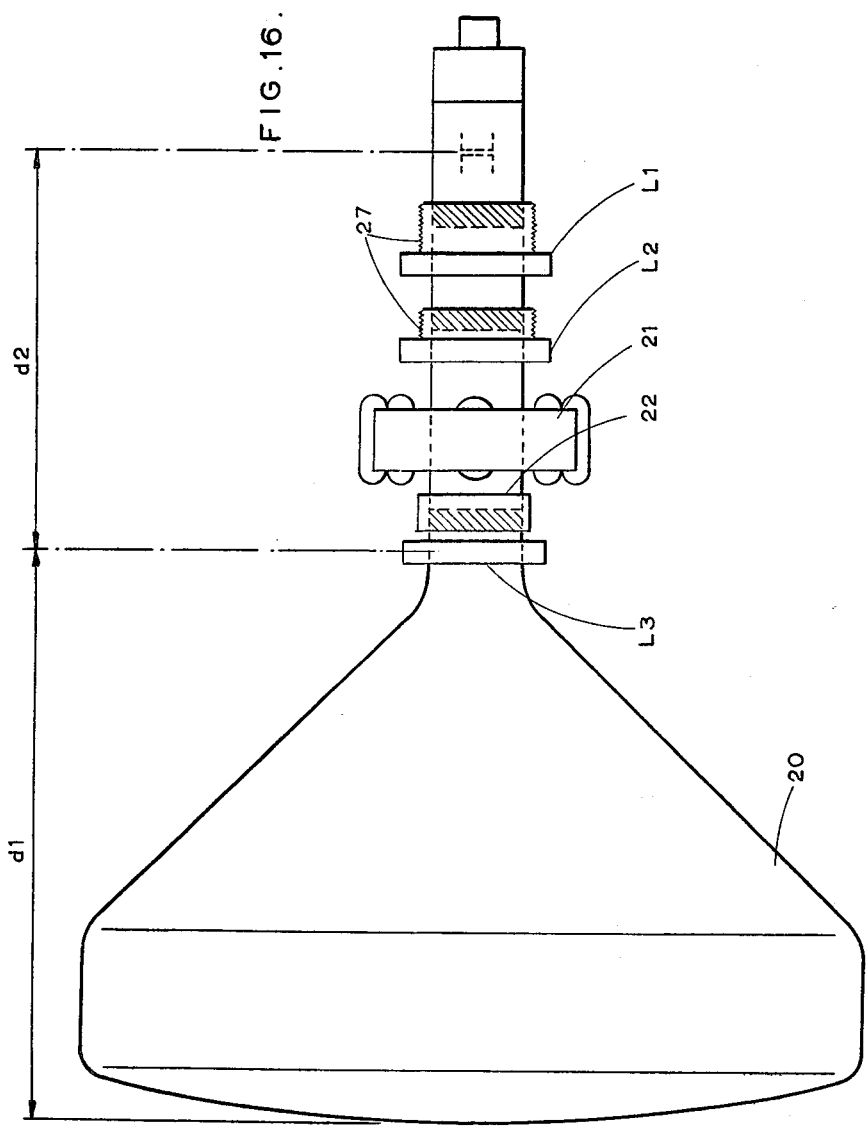

The lens L3 is shown in FIGURE 21 in its assembled condition while FIGURE 22 is an exploded view thereof. The scanning yoke 21 is shown in FIGURE 20 and contains a pair of correcting coils 25 the purpose of which will be explained with reference to FIGURES 17 to 19. The lenses L1 and L2 are of the type shown in FIGURES 25 to 27, FIGURES 25 and 26 being rear and front views, respectively, of the assembled lens while FIGURE 27 is an exploded view. In the layout of FIGURE 16 the adjusting rings 27 of lenses L1 and L2 are shown in different positions of adjustment with respect to the yokes.

Figure 23:
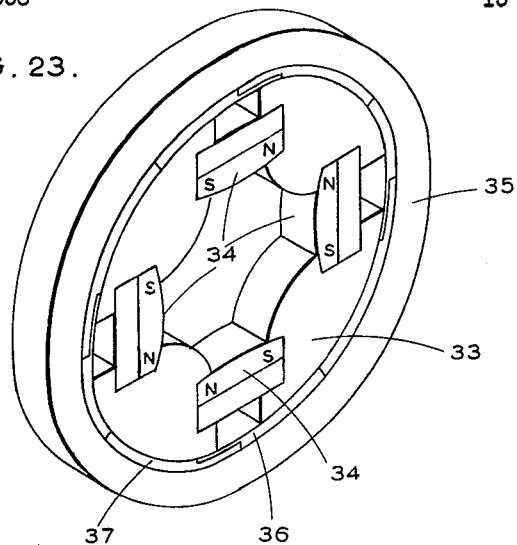
Figure 24:
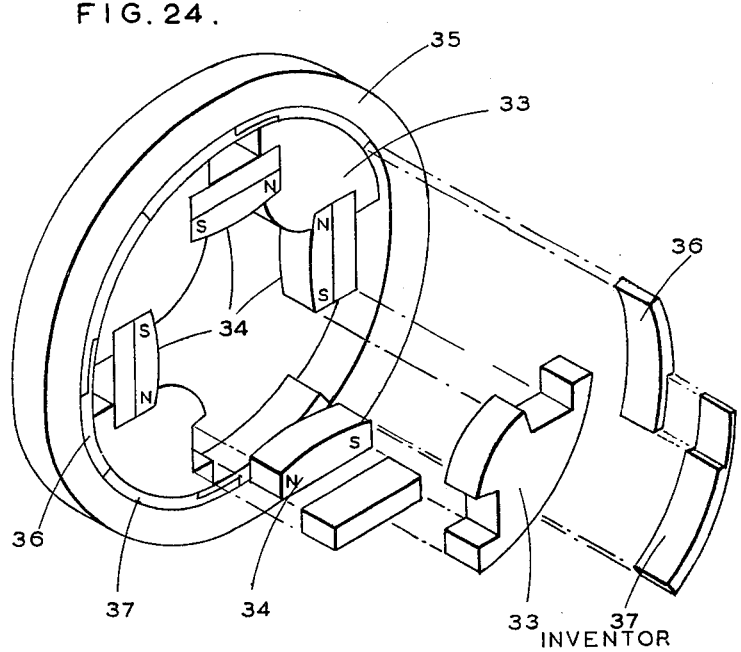

An alternative type of lens for use as lenses L1 and L2 is shown in FIGURES 23 and 24, of which the latter is an exploded view of the former.

This example is capable of operating satisfactorily for conventional television display purposes with the relatively large deflection angles normally used and has produced 3 mc. resolution with a 90° picture tube.

Until now it has been postulated that cylindrical lenses can be used which have fields consisting of equilateral rectangular hyperbolic lines (a quadripole can be regarded as such in the X or Y plane). When practical details are considered, this field formation is unsuitable for the amplifying lens L3 in the case of a rectangular raster with wide deflection angles. The chief disadvantages are the wide variations of electron path length in the lens field, and the need for image plane correction in the amplifying lens.

Neither is it desirable to use standard type scanning coils since even a perfect deflecting yoke would produce a field whose curvature would be unlikely to produce the required image plane formation.

Spot size can be reduced by placing the effective centre of lens L3 as near to the screen as possible. This can be done by reducing the length of L3 and the effect can be increased by placing a further lens whose polarity is opposite to that of the magnifying lens L3 between the latter and the scanning yoke (the equivalent of such lens can be provided in the form of the ring shunt 22).

(*2*) *Conditions.*—These developments will now be described in more detail and for convenience the "coincident-image plane" condition will be assumed at the centre of the screen, i.e. the condition in which horizontal and vertical focus planes are coincident to form a common object plane for the magnifying lens. Since the problems are interrelated it is more convenient to deal with "deflection de-focusing" distortion first. Although deflection de-focusing occurs also in conventional systems, it is more closely interrelated with raster shape than when, as in the present arrangement, it is applied to a scanning amplifier system in which one scan is of very different amplitude compared with its quadrature counterpart.

(*3*) *Correction in Deflection Coils for Deflection De-Focusing.*—When the beam is deflected in the vertical direction, its deviation is opposed by the final lens in such a way as to finally compel the beam to cross the axis. In so doing, the beam is acted upon by the lens field for a longer time, and this will tend to converge the beam additionally in the vertical direction and to diverge the beam additionally in the horizontal direction.

In spite of the additional horizontal beam divergence, the picture on the screen of a tube with normal face curvature shows marked excess convergence as the frame scan is applied in either direction, and this is due to the field curvature of the scanning coils which causes the vertical image plane of the horizontal focus, in the region of the magnifying lens, to have a shape unsuitable for a normal picture tube face.

Figure 17:
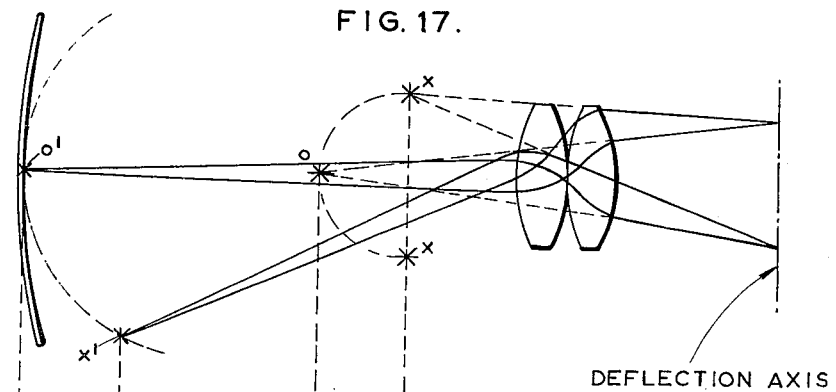
Figure 18:
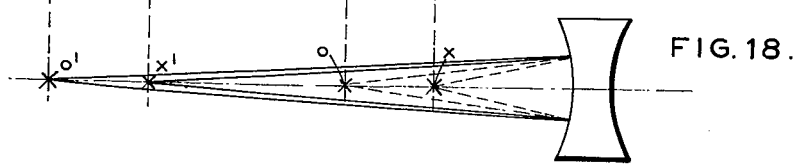

FIGURE 17 is a schematic vertical longitudinal section of lens L3 while FIGURE 18 is a corresponding plan view.

It can be seen from FIGURE 17 that the point of focus would travel along the arc x—o—x in the absence of the lens, and FIGURE 18 illustrates the fact that the beam will have excessively convergent characteristics in the line scan direction when frame scan only is applied.

Although this de-focusing similarly occurs due to line scan, the deflection applied is so small (due to the greater gain) that the problem need not be considered in practice.

This focal distance change x—o—x causes a new image plane near the screen to fall on the arc x'—o' since the arc x—o—x forms an object plane for the magnifying lens, and this effect influences both line and frame direction focus.

The varying de-focusing represented by the arc x'—o' introduces the requirement for a spherically divergent dynamic correcting lens (whose power varies in time and increases with either polarity of frame deflection) placed between the deflector coils and magnifying lens. Such a lens is difficult to achieve in practice.

However, a divergent lens cylindrical in the plane considered is possible and is tolerable for two reasons in spite of its quadrature converging characteristics:

(I) Increased depth of focus allows considerable tolerance of vertical image plane of vertical focus.

(II) Such lenses can be produced where the diverging characteristics in one place are stronger than the converging characteristics in the quadrature plane.

Such a correcting lens comprising two coils 25 will now be described with reference to FIGURE 19 (which is a view along the axis), such lens employing the frame scan current, or a part thereof, as its energizing current.

Consider a beam of electrons as shown in cross-section at $b1$ and $b2$. The vertical components of flux increase in intensity as the beam moves upward. These have already been shown to impart to the beam diverging characteristics in the horizontal direction (position $b2$).

Should the beam be placed in the lower half, the vertical flux components would tend to converge the beam in the horizontal direction, but this need not be considered because, in a practical coaxial arrangement, the beam, on encountering the central flux, would be deflected to the upper part of the lens (assuming that the beam width is small compared with the beam deflection).

Figure 19:
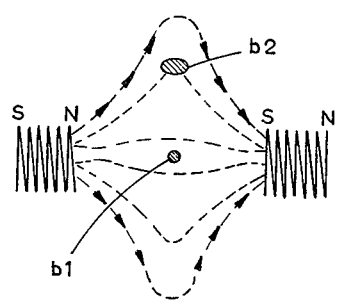

When the current through the coils 25 of FIGURE 19 is reversed, the opposite effect occurs thus allowing unidirectional change in the overall effective focal length to take place for alternating currents.

This naturally has an undesirable effect on vertical focus but, as has already been described, the action is less severe and the overall focus is less critical.

The coils of this correcting lens can be incorporated in the scanning coil system as shown at 25 in FIGURE 20. They could, if more convenient, be placed at or near the magnifying lens but this may only be preferable when the beam width is large.

The amount of de-focusing correction required from the lens of FIGURE 19 decreases with the distance of the scanning coils from the magnifying lens.

(4) *Correction for Deflection Sensitivity Change.*— It may be necessary to alter the magnifying lens characteristics in such a way that the deflection sensitivity does not vary with frame deflection, otherwise intolerable distortion of the vertical sides of the raster may occur.

A magnifying lens field with a suitable non-linear gradient is achieved by increasing the vertical components of flux, along the horizontal axis, and causing this field correction to penetrate to a depth sufficient to increase the horizontal axis magnification as the beam is progressively scanned in the line direction.

Such a field is given by the magnifying lens arrangement shown in FIGURES 21 and 22.

The field correction is restricted to a zone near to the axis of line deflection to balance the increased sensitivity due to quadrature scan displacement with its associated increase of path length.

The degree of field correction to be introduced depends to a certain extent upon the distance between the amplifying lens and the scanning coils, and more field correction is required when this distance is reduced.

There are other ways of increasing axial line deflection along the X axis such as altering the magnetic aspect ratio, but such fields tend to penetrate insufficiently towards the centre and may tend to cause distortion of the top and bottom of the raster.

There are slight inherent distortions of the top and bottom of the raster due to change of path length with line scan, but these are very slight and may be corrected in the accepted way by using "raster correction" magnets on the flare of the tube, preferably in the horizontal position.

(5) *Reduction of Spot Magnification.*—The magnetic field of the magnifying lens L3 tends to react with the scanning yoke. This increases the effective length of the lens and, in so doing, reduces the distance between the effective lens centre and the initial beam cross-over near the cathode.

This increases magnification of the spot.

The spot magnification can be reduced if a weaker lens of opposite polarity to the magnifying lens is placed between the latter and the scanning yoke.

The equivalent of a lens of opposite polarity is obtained by placing a circular magnetic shunt (22 in FIGURE 16) between the two components.

This will weaken the front lens L3 and will also modify the field formation so that care must be taken to obtain the right magnifying lens power with this shunt in position before the correction is finally adjusted for correct raster shape.

(6) *Focus Lenses L1 and L2.*—High quality quadripole lenses such as that shown in FIGURES 23 and 24 may be used as lenses L1 and L2.

Here the magnets have curved faces so that their interior form is that of the equilateral rectangular hyperbola at the appropriate distance from the lens centre. Thus all magnetic lines of force emanating internally and the equipotential surfaces of the poles are of the optimum form except for mutual repulsion of the lines in the axial direction.

The adjustment of lens powers is somewhat difficult with the lens of FIGURES 23–24 and in practice, because only the centre portion of the field is used, more convenient lenses such as that shown in FIGURES 25–27 can be used for L1 and L2 without very much spot degradation provided that the beam width is relatively small. With this lens the field strength is adjustable by screwing in or out the non-magnetic ring 27 containing a steel ring 28.

(7) *Constructional Details.*—As regards lens L3, measurement of lens strength is difficult because of interaction, but theoretical calculations indicate the following focal lengths and field strengths for a system using focus lenses as shown in FIGURE 27:

|  | Focal length (cm.) | Field Strength (Oe./cm.) | Axial field length at ½ peak value |
| --- | --- | --- | --- |
| L1 | 2.69 | 80.4 | 2.9 |
| L2 | 3.3 | 66.3 | 2.6 |
| L3 | 0.546 | 128 | 3.2 |

These values give a line-scan spot-movement gain of about 10 times and a frame scan spot-movement gain of about 1.4 times at a final anode voltage of 18 kv. (the corresponding power gains are about 100 and 2 respectively).

As regards the deflection system of FIGURE 20, the circular yoke 48 is made up of a pair of annular 12-toothed Mullard Ferroxcube yokes type FX1353 each half inch thick. The frame coils are toroidal and are shown at 49 while the line coils are shown at 50 and 51. The ratio of ampere-turns between coils 25 and coils 49 is about 1.615.

In the lens L3 of FIGURES 21–22, elements 30 are two mild steel magnetic shunts, and 31 are non-magnetic magnet housings, in this case vertically adjustable to allow raster shape correction adjustment. The lens uses ten bar magnets with polarities as shown, eight of them being in four pairs located by non-magnetic spacing blocks 32. The other two are each carried by a housing 31 and effect adjustment when the latter is moved up or down.

FIGURES 23–24 show a high quality quadripole focus lens. It comprises soft iron pole pieces 33 and four magnets 34.

Overall field strength is variable by rotation of a focus ring 35 which contains alternate brass (36) and steel (37) segments.

When the steel pieces 37 lie across the magnets, the main part of the flux is shunted from the vicinity of the beam.

All curves shown in FIGURES 23–24 both on magnets and pole pieces represent equilateral rectangular hyperbolae appropriate to their distance from the lens centre.

The maximum strength of magnets 34, if only four magnets are used, would not be sufficient for the front lens; but in any case the field shape is unsuitable for such a role.

FIGURES 25–27 show a cheaper lens which can be used for lenses L1–L2 when a relatively narrow beam is used. The brass threaded ring 27 has a steel insert 28 (inner diameter e.g. 1 7/16 inches) which can, by its axial position, alter the field strength of the lens formed by four magnets 39. Each magnet is secured in its holder 47 by end pressure applied by a screw 40.

The overall structure is held on the tube neck by a clamp 41 which tightens on to a rubber washer 42 (clamp 41 is drawn by screws 43 towards a semi-circular abutment 44 rigid with plate 45).

The magnetic assembly can be moved radially with respect to plate 45 to allow for individual magnet variations and this is allowed by the large clearance provided by the fixing holes 46. All materials are non-magnetic except the magnets and the steel ring 28.

All the bar magnets used in FIGURES 21 to 27 are Mullard Ticonal cast magnets type M1547 fully saturated before use (in FIGURES 23–24 part is ground away to give the curved faces).

*Example III*

This example differs from Examples I and II inasmuch as the quadripole focusing lenses L1 and L2 of FIGURES 10A and 10B are replaced by a single electro-magnetic spherical focusing lens Lf. Otherwise the example employs the same tube and the same components as Example II.

The arrangement is shown in side elevation, substantially to scale, in FIGURE 28, the tube 20, magnifying lens L3, shunt 22 and scanning yoke 21 are retained with their same mutual spacing. The spherical focusing coil is indicated to scale at Lf and has a length of 1½ ins. and a diameter of 3½ ins., the spacing between lens Lf and scanning yoke 21 being ¼ in. Although shown with these dimensions, lens Lf can have the same construction and energizing current as either of the lenses Lm, Lf of Example IV.

*Example IV*

As has been explained previously, a modification of the invention permits the image-immersion or cross-over action of the magnifying lens described with reference to FIGURE 9 and FIGURE 10B to be extended to the X plane as well as the Y plane in which case FIGURES 9, 10B and 14B may be taken as illustrating the action of the magnifying lens in the X plane as well as the Y plane. Such a lens may be used with quadripole focusing means as described with reference to FIGURES 10A–10B or with a spherical focusing lens. As will be appreciated, if both the magnifying and focusing systems have spherical characteristics, the same angular magnification will be available in both the X and the Y planes, and the present example employs such an arrangement (the same would hold for a spherical magnifying lens used with a pair of quadripole focus lenses having coincident image planes).

The arrangement is shown in FIGURE 29 and employs a pair of conventional focus coils for the magnifying lens Lm and focus lens Lf. Between these lenses there is placed a conventional line and frame scanning system having a yoke 60 of a type which would normally be used for 90° scanning rather than for the smaller angles of the present example. The spacing between the centre of the scanning system and the centre of the magnifying lens Lm is about 2½ inches and the spacing from the centre of the scanning system to the centre of the focus lens Lf is about 2 inches. The tube 20 can be of the same type as the tube of FIGURES 16 and 28, in which case resolution equal to or approaching 3 mc. can be obtained although there will be slight raster distortion in the absence of correcting means.

With such a system it has been possible to obtain a spot-movement gain of up to about 3 in each direction, this corresponding to a power gain of about 9. Greater gains can be obtained by moving the deflection centre further away from the lens Lm but this will reduce the quality of the spot.

As regards the constructional details, the magnifying lens Lm may have 25,000 turns of 38 S.W.G. wire with a current of 70 milliamps and the soft iron shell or housing may have dimensions substantially as follows:

Outer diameter _____ 3¾ inches.
Inner diameter _____ 1½ inches.
Axial thickness _____ 2 inches.
Air gap Am _____ $\tfrac{9}{32}$ inch and spaced ⅜ inch from the front of the lens.

The focusing lens Lf may be a conventional lens with e.g. 3000 turns of 29 S.W.G. wire carrying 300 ma. and its housing may have the following dimensions:

Inches
Outer diameter _____ 3½
Inner diameter _____ 1½
Axial thickness _____ 1¾
Air gap Af _____ ¼

Whereas the image-immersion or cross-over action has been illustrated hitherto with a single cross-over taking place within the lens, it is possible to increase still further the convergence of the lens so as to create two or more successive cross-overs within the lens field with the beam still emerging in a convergent manner towards an external focus on the screen. If this is done in the Y plane of a magnetic system such as that of FIGURES 10A–10B, still further magnification will be obtained in the X plane (but not in the Y plane) but this will be done at the expense of still further increase in the spot size in the X plane. However, in cases in which the spot size can be restricted by reducing the magnification of the object cross-over near the cathode, the arrangement may have practical applications.

This multiple cross-over action can also be applied in both the X and Y planes, e.g. in the arrangement of FIGURE 29, but the gain is limited to that obtainable with one cross-over (on the other hand there is little or no degradation of spot quality). The lens action is shown schematically (for the case of two cross-overs) in FIGURE 30 where the deflection centre is at D and the effective lens boundaries are Lb.

The considerations given above as to the choice of the position of the deflecting means apply to cases in which single-stage deflection is employed. Although the embodiments illustrated hitherto employ such single-stage deflection it will be appreciated that multi-stage deflection may be used. Thus for example two-stage deflection may be employed and such a method is particularly useful inasmuch as it permits a virtual deflection centre to be produced on the axis at which point a thin lens can be placed without any material effect on the scanning.

This is illustrated schematically in FIGURE 15 wherein a first deflection centre exists at D1, together with a second deflection centre at D2 where opposite deflection is effected, and a virtual deflection centre at Dv. Such two-stage deflection may be used in various arrangements. In a first example the arrangement employs a quadripole magnifying lens (as described for example with reference to FIGURES 10A–10B) together with a spherical converging focusing lens. In such an arrangement X deflection may be applied with both of the real deflection centres on the gun side of the effective centre of the focusing lens and the virtual deflection centre preferably located at said centre of the focusing lens (as an alternative single deflection may of course be used e.g. with both the X and Y deflections applied between the two lenses or with the X deflection centre just on the gun side of the centre of the focusing lens and the Y deflection centre coincident with the centre of the focusing lens).

In a second example the arrangement may comprise, again, a single quadripole magnifying lens but the focusing lens, while remaining spherical, may be arranged to have such strength as to produce a focus or cross-over within its effective field. In this case, double deflection may again be applied in one or in each of the X and Y directions with both of the real deflection centres on the gun side of the effective centre of the focusing lens and the virtual deflection centre preferably coincident with said effective centre of the focusing lens (again, such an arrangement can be used alternatively with single-stage deflection in one or each of the X, Y directions).

The latter arrangement of lenses is also advantageous inasmuch as it permits single-stage deflection to be applied in the X and/or Y direction on the gun side of the centre of the focusing lens.

There is a third example in which two-stage deflection may be advantageous. In this arrangement the magnifying lens is, once more, a quadripole whereas the focusing means is constituted by a single quadripole oriented at 90° thereto. In this case two-stage deflection may be applied in both the X and Y planes with the virtual X and Y deflection centres (corresponding to point D$v$ of FIGURE 15) located at or near the centre of the focusing lens.

The expression "spherical" employed in this specification in relation to electron optical elements should be regarded as covering broadly any form of axial symmetry.

What I claim is:

1. A display system including in combination a cathode ray tube having a beam receiving target and a beam-producing gun for directing a beam thereto, means for deflecting said beam in mutually orthogonal first and second directions to produce an image on the surface of said target having first and second dimensions, scan-magnifying means comprising a first magnetic electron lens of the spherical type for producing a magnetic field within said tube between said deflection means and said target to converge said beam in each of said first and second directions to invert and magnify each of said first and second dimensions of said image, and focus correcting means comprising a second magnetic electron lens of the spherical type to bring the beam to a predetermined focus in each of said directions to compensate for distortions induced in the size of said beam by said scan-magnifying means.

2. A display system including in combination a cathode ray tube having a beam receiving target and a beam-producing gun for directing a beam thereto, means for deflecting said beam in mutually orthogonal first and second directions to produce an image on the surface of said target having first and second dimensions, scan-magnifying means comprising a first magnetic electron lens of the spherical type for producing a magnetic field within said tube between said deflection means and said target to converge said beam in each of said first and second directions to invert and magnify each of said first and second dimensions of said image, and focus correcting means comprising a second magnetic electron lens of the spherical type to bring the beam to focus in both said orthogonal directions to compensate for the tendency of said scan-magnifying means to enlarge the size of said beam.

3. A display system including in combination a cathode ray tube having a beam receiving target and a beam-producing gun for directing a beam thereto, means for deflecting said beam in mutually orthogonal first and second directions to produce an image on the surface of said target having first and second dimensions, scan-magnifying means comprising a first magnetic electron lens of the spherical type for producing a magnetic field within said tube between said deflection means and said target to converge said beam in each of said first and second directions to invert and equally magnify each of said first and second dimensions of said image, and pre-focus correcting means disposed between said gun and said deflecting means comprising a second magnetic electron lens of the spherical type to bring the beam to a focus in both said orthogonal directions to compensate for the tendency of said scan-magnifying means to enlarge the size of said beam.

References Cited in the file of this patent

UNITED STATES PATENTS

| | | |
|---|---|---|
| 2,058,914 | Rudenberg | Oct. 27, 1936 |
| 2,076,662 | Michelssen | Apr. 13, 1937 |
| 2,205,071 | Skellett | June 18, 1940 |
| 2,212,640 | Hogan | Aug. 27, 1940 |
| 2,237,445 | McGee | Apr. 8, 1941 |
| 2,442,975 | Grundmann | June 8, 1948 |
| 2,498,354 | Bocciarelli | Feb. 21, 1950 |
| 2,520,813 | Rudenberg | Aug. 29, 1950 |
| 2,670,450 | Le Poole | Feb. 23, 1954 |
| 2,689,922 | Francken | Sept. 21, 1954 |
| 2,834,889 | Fries | May 13, 1958 |
| 2,892,962 | Ross | June 30, 1959 |
| 2,944,174 | Taylor | July 5, 1960 |
| 2,944,175 | Taylor | July 5, 1960 |

FOREIGN PATENTS

| | | |
|---|---|---|
| 473,675 | Great Britain | Oct. 18, 1937 |
| 553,466 | Great Britain | May 24, 1943 |
| 109,216 | Sweden | Dec. 7, 1943 |